US010339086B2

(12) United States Patent
Kim

(10) Patent No.: US 10,339,086 B2
(45) Date of Patent: Jul. 2, 2019

(54) USB COMMUNICATION CONTROL METHOD FOR USB HOST

(71) Applicant: Hyundai Motor Company, Seoul (KR)

(72) Inventor: Hyangjin Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 15/359,910

(22) Filed: Nov. 23, 2016

(65) Prior Publication Data
US 2018/0060262 A1 Mar. 1, 2018

(30) Foreign Application Priority Data

Aug. 30, 2016 (KR) ........................ 10-2016-0110677

(51) Int. Cl.
*G06F 13/40* (2006.01)
*G06F 13/42* (2006.01)
*G06F 13/10* (2006.01)

(52) U.S. Cl.
CPC ........ *G06F 13/4022* (2013.01); *G06F 13/102* (2013.01); *G06F 13/4282* (2013.01)

(58) Field of Classification Search
None
See application file for complete search history.

(56) References Cited

U.S. PATENT DOCUMENTS

| 7,640,382 | B2 * | 12/2009 | Blackwell | ............... G06F 13/12 710/62 |
| 8,848,608 | B1 * | 9/2014 | Addepalli | ............. H04W 4/046 370/328 |
| 9,225,718 | B2 * | 12/2015 | Jain | ................... G06K 19/07739 |
| 2010/0105454 | A1 * | 4/2010 | Weber | ..................... G06Q 30/02 463/1 |
| 2011/0230260 | A1 * | 9/2011 | Morrow | ................... G07F 17/32 463/30 |
| 2013/0096647 | A1 * | 4/2013 | Amara | ...................... A61N 1/05 607/59 |
| 2013/0144482 | A1 * | 6/2013 | Tuukkanen | ........... G06F 3/0482 701/29.6 |
| 2013/0332632 | A1 * | 12/2013 | Rathi | ................ H04M 1/72527 710/38 |
| 2014/0019652 | A1 * | 1/2014 | Soffer | ..................... G06F 21/83 710/73 |

(Continued)

FOREIGN PATENT DOCUMENTS

| JP | 2001337752 A | 12/2001 |
| JP | 2007-334731 A | 12/2007 |

(Continued)

*Primary Examiner* — Michael Sun
(74) *Attorney, Agent, or Firm* — Mintz Levin Cohn Ferris Glovsky and Popeo, P.C.; Peter F. Corless

(57) ABSTRACT

A universal serial bus (USB) communication control method for a USB host connected to a USB accessory through a USB cable includes: receiving a request signal for switching from a first service to a second service in the USB accessory when the first service is being executed in the USB accessory; initializing a USB port of the USB host so as to perform switching to the second service in the USB accessory; and when the switching to the second service through initialization of the USB port is successfully performed, executing the second service in the USB accessory.

10 Claims, 9 Drawing Sheets

(56) References Cited

U.S. PATENT DOCUMENTS

2014/0344728 A1* 11/2014 Tuukkanen ........ G01C 21/3664
715/763
2016/0094502 A1* 3/2016 Pollack .................. H04L 51/12
726/4
2016/0217093 A1* 7/2016 Whittington .......... H04L 12/462

FOREIGN PATENT DOCUMENTS

| JP | 2014-085857 A | 5/2014 |
| JP | 2015-054582 A | 3/2015 |
| JP | 2015-211491 A | 11/2015 |
| KR | 2014-0100797 A | 8/2014 |
| KR | 10-1491382 B1 | 2/2015 |

* cited by examiner

USB COMMUNICATION CONTROL METHOD FOR USB HOST

CROSS-REFERENCE TO RELATED APPLICATION

This application claims the benefit of and priority to Korean Patent Application No. 10-2016-0110677, filed on Aug. 30, 2016 in the Korean Intellectual Property Office, the entire disclosure of which is incorporated herein by reference as if fully set forth herein.

BACKGROUND

1. Technical Field

Embodiments of the present disclosure relate generally to a universal serial bus (USB) communication method and, more particularly, to a USB communication method between a head unit of a vehicle and a mobile device of a user.

2. Description of the Related Art

In modern vehicles, a mobile device belonging to a user can be connected to a head unit of the vehicle, e.g., through a USB cable, such that various functions of the mobile device can be used through the head unit of the vehicle. Wireless communication, such as Wi-Fi or Bluetooth, has also been widely used. In wireless communication, various control or data transmission can be implemented through wireless access. However, the manufacturing costs of products are very expensive in wireless communication, and high-priced maintenance costs are needed to maintain high stability in wireless communication.

Therefore, USB communication has been used as a substitute for wireless communication. USB communication involves a connection between a USB host and a USB accessory using a USB cable. The USB communication has advantages in that it provides simple and direct communication, provides a power-supply voltage using a USB, and guarantees desired data performance, resulting in reduction of radio frequency (RF) design consideration and costs.

In order to connect the USB accessory to the USB host, the USB host is set to a host mode, and the USB accessory is connected to the USB host through the USB cable. In one example, the head unit of the vehicle may operate as the USB host, and the mobile device may operate as the USB accessory.

If, for example, the USB host and the USB accessory operate based on the Android™ operating system, switching from one service to the other service when a single USB accessory is used for at least two different services through USB communication while the USB accessory is connected to the USB host through the USB cable, the USB cable connecting the USB host to the USB accessory should be physically disconnected from the USB host. The USB accessory should then be reconnected to the USB host using the USB cable.

SUMMARY

It is an aspect of the present disclosure to provide a USB communication control method in which, when a user desires to switch a service being provided through an Android-based USB accessory to another service while an Android-based USB host is connected to the USB accessory through a USB cable, the USB cable need not be physically disconnected from the USB host and the USB accessory, and the service can be switched to the other service without reconnection of the USB accessory to the USB host through the USB cable.

Additional aspects of the disclosure will be set forth in part in the description which follows and, in part, will be apparent from the description, or may be learned by practice of the disclosure.

In accordance with embodiments of the present disclosure, a universal serial bus (USB) communication control method for a USB host connected to a USB accessory through a USB cable includes: receiving a request signal for switching from a first service to a second service in the USB accessory when the first service is being executed in the USB accessory; initializing a USB port of the USB host so as to perform switching to the second service in the USB accessory; and when the switching to the second service through initialization of the USB port is successfully performed, executing the second service in the USB accessory.

The initializing of the USB port may include: initializing a data terminal of the USB port.

The first service and the second service may be provided by execution of an application based on an Android operating system being executed in the USB accessory.

The USB communication control method may further include: when the initialization of the USB port of the USB host fails, waiting for a predetermined time, and then reattempting to initialize the USB port of the USB host so as to perform the switching to the second service in the USB accessory; and when the switching to the second service through re-initialization of the USB port is successfully performed, executing the second service in the USB accessory.

The USB communication control method may further include: when the switching to the second service through re-initialization of the USB port fails, disconnecting the USB cable from the USB port or the USB accessory, and then reconnecting the USB cable to the USB port or the USB accessory, thereby attempting to switch to the second service in the USB accessory.

The USB communication control method may further include: waiting for a predetermined time after disconnection of the USB cable, and then detecting reconnection of the USB cable.

The USB communication control method may further include: waiting for a predetermined time after reconnection of the USB cable, and then attempting to switch to the second service in the USB accessory.

The predetermined time may be a standby time needed for service switching in the USB accessory.

The USB communication control method may further include: initializing a power-supply terminal of the USB port after release of the USB cable.

Furthermore, in accordance with embodiments of the present disclosure, a universal serial bus (USB) communication control method for a USB host connected to a USB accessory through a USB cable includes: receiving a request signal for switching from a first service to a second service in the USB accessory when the first service is being executed in the USB accessory; initializing a USB port of the USB host so as to perform switching to the second service in the USB accessory; when the initialization of the USB port of the USB host fails, waiting for a predetermined time, and then reattempting to initialize the USB port of the USB host; and when the switching to the second service through initialization or re-initialization of the USB port is successfully performed, executing the second service in the USB accessory.

The initializing of the USB port may include: initializing a data terminal of the USB port.

The first service and the second service may be provided by execution of an application based on an Android operating system being executed in the USB accessory.

Furthermore, in accordance with embodiments of the present disclosure, a universal serial bus (USB) communication control method for a USB host connected to a USB accessory through a USB cable includes: receiving a request signal for switching from a first service to a second service in the USB accessory when the first service is being executed in the USB accessory; initializing a USB port of the USB host so as to perform switching to the second service in the USB accessory; when the switching to the second service through initialization of the USB port fails, disconnecting the USB cable from the USB port or the USB accessory, and then reconnecting the USB cable to the USB port or the USB accessory, thereby attempting to switch to the second service in the USB accessory; and when the switching to the second service through initialization of the USB port or through disconnection and reconnection of the USB cable is successfully performed, executing the second service in the USB accessory.

The USB communication control method may further include: waiting for a predetermined time after disconnection of the USB cable, and then detecting reconnection of the USB cable.

The USB communication control method may further include: waiting for a predetermined time after reconnection of the USB cable, and then attempting to switch to the second service in the USB accessory.

The predetermined time may be a standby time needed for service switching in the USB accessory.

The USB communication control method may further include: initializing a power-supply terminal of the USB port after disconnection of the USB cable.

Furthermore, in accordance with embodiments of the present disclosure, a universal serial bus (USB) communication control method for a USB host connected to a USB accessory through a USB cable includes: receiving a request signal for switching from a first service to a second service in the USB accessory when the first service is being executed in the USB accessory; initializing a USB port of the USB host so as to perform switching to the second service in the USB accessory; when the initialization of the USB port of the USB host fails, waiting for a predetermined time, and then reattempting to initialize the USB port of the USB host; when the switching to the second service through initialization of the USB port is successfully performed, disconnecting the USB cable from the USB host or the USB accessory, and then reconnecting the USB cable to the USB host or the USB accessory, thereby attempting to switch to the second service in the USB accessory; and when the switching to the second service through initialization or re-initialization of the USB port or through disconnection and reconnection of the USB cable is successfully performed, executing the second service in the USB accessory.

BRIEF DESCRIPTION OF THE DRAWINGS

These and/or other aspects of the disclosure will become apparent and more readily appreciated from the following description of the embodiments, taken in conjunction with the accompanying drawings of which.

Figure 1:
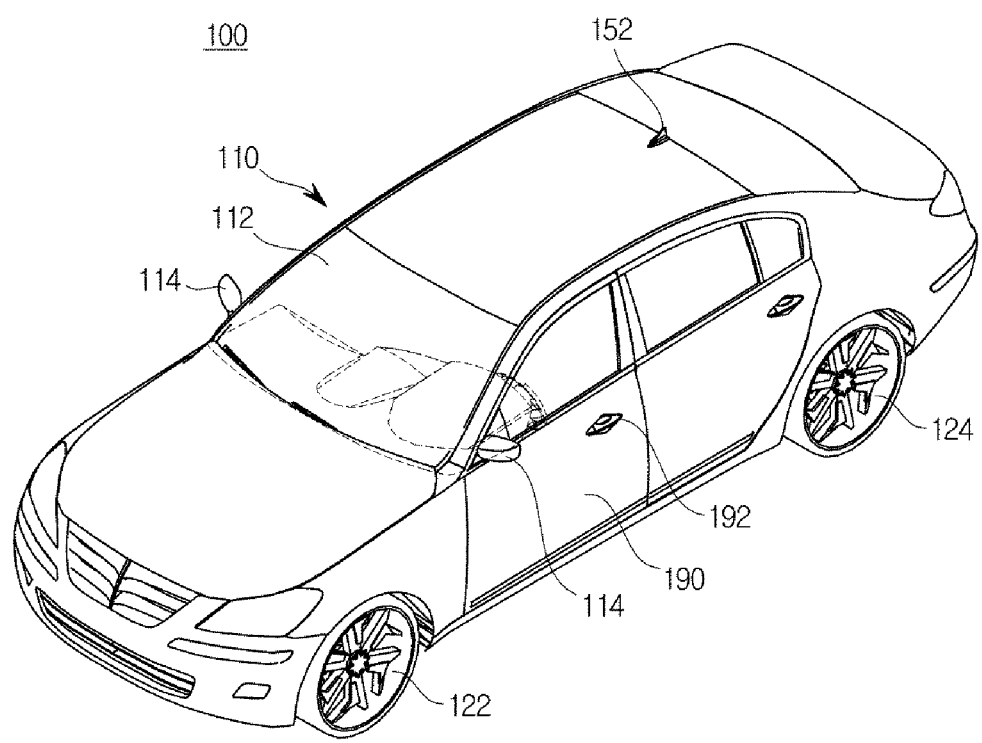
FIG. 1 is a view illustrating the appearance of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the embodiments of the present disclosure, examples of which are illustrated in the accompanying drawings, wherein like reference numerals refer to like elements throughout. As those skilled in the art would realize, the described embodiments may be modified in various different ways, all without departing from the spirit or scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 is a view illustrating the appearance of a vehicle according to embodiments of the present disclosure. As shown in FIG. 1, the vehicle 100 may have the following structures. It should be understood that the exterior of the vehicle 100 shown in FIG. 1 and described below is provided merely for demonstration purposes and does not limit the scope of the present disclosure. Rather, the exterior of the vehicle 100 may be arranged or configured in any suitable manner, limited only by the claims defined herein.

A windshield 112 arranged at a front upper portion of the main body 110 may provide a forward view of the vehicle to a vehicle driver who rides in the vehicle, and may protect the vehicle driver from the wind.

Side-view mirrors 114 may include a left side-view mirror provided at the left of the main body 110 and a right side-view mirror provided at the right of the main body 110, so that the driver who rides in the vehicle may obtain visual information of the lateral and rear directions of the vehicle through the side-view mirrors 114. A single left side-view mirror is mounted to the left door 190, and a single right side-view mirror is mounted to the right door 190.

The doors 190 may be rotatably mounted to the left and right sides of the main body 110, so that a driver and passenger can easily ride in or leave the vehicle through the doors 190. When the doors 190 are closed, the doors 190 can shield the indoor space of the vehicle from the outside. The doors 90 can be locked or unlocked using a door lock device 192. A method for locking/unlocking the door lock device 192 may be classified into a first method for allowing the user to approach the vehicle 100 so that the user can directly manipulate the button or lever of the door lock device 192; and a second method for allowing the user to remotely lock or unlock the door lock device 192 using a remote controller or the like at a remote site distant from the vehicle 100.

The antenna 152 may receive broadcast/communication signals, for example, telematics signal, digital multimedia broadcasting (DMB) signal, digital television (TV) signal, global positioning satellite (GPS) signal, etc. The antenna 152 may be a multi-functional antenna configured to receive various kinds of broadcast/communication signals, or may be a single functional antenna configured to receive any one of broadcast/communication signals.

Front wheels 122 may be provided at the front of the vehicle 100, and rear wheels 124 may be provided at the rear of the vehicle 100. The front wheels 122 and the rear wheels 124 may receive drive power from the engine (not shown), so that the front wheels 122 and the rear wheels 124 can rotate.

Figure 2:
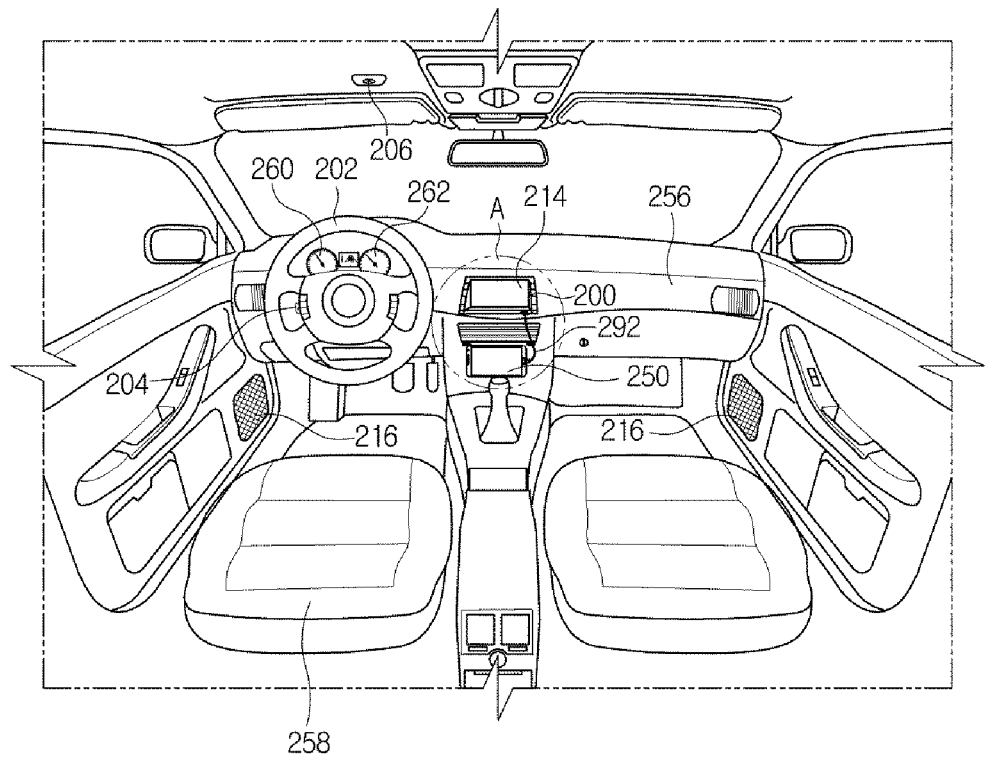
FIG. 2 is a view illustrating an indoor space of the vehicle shown in FIG. 1 according to embodiments of the present disclosure.

FIG. 2 is a view illustrating the indoor space of the vehicle shown in FIG. 1 according to embodiments of the present disclosure. The indoor space of the vehicle 100 of FIG. 2 has the following structure. It should be understood that the interior of the vehicle 100 shown in FIG. 2 and described below is provided merely for demonstration purposes and does not limit the scope of the present disclosure. Rather, the interior of the vehicle 100 may be arranged or configured in any suitable manner, limited only by the claims defined herein.

The dashboard 256 may protrude from a lower part of the windshield 112 toward the vehicle driver. The dashboard 256 may include a plurality of electronic components needed for the vehicle driver who manipulates the vehicle 100, such that the vehicle driver who looks forward can manipulate various devices mounted to the dashboard 256 using the dashboard 256.

A driver seat 258 is provided at the rear of the dashboard, such that the driver of the vehicle 100 can sit in the driver seat 258. The driver seat 258 is provided at the rear of the dashboard 256, such that the vehicle driver who has a stable posture can drive the vehicle 100 while viewing various devices of the dashboard 256.

The cluster display units (260, 262) located adjacent to the driver seat 258 of the dashboard 256 may display operation information on the vehicle 100. The cluster display units (260, 262) may include a speed gauge 260 for displaying a traveling speed of the vehicle 100, and revolutions per minute (RPM) gauge 262 for displaying a rotation speed of a power system (not shown).

The head unit 200 may be a multimedia device for performing various multimedia functions according to a manipulation command of the vehicle driver and passengers. The head unit 200 may perform a navigation function for navigation, an audio function, and a video function. The head unit 200 includes the audio function, the video function, and the navigation function. If necessary, the head unit 200 may include only some functions, instead of all the audio, video, and navigation functions.

The head unit 200 may include a display 214 for displaying either information regarding the traveling road of the vehicle 100 or the route to a destination designed by the vehicle driver and passenger. In addition, the head unit 200 is electrically coupled to the speaker 216 so that the sound signal of the head unit 200 can be transferred to the speaker 216 and output through the speaker 216.

In addition, the head unit 200 may be connected to the mobile device 250 through wired communication such as a Universal Serial Bus (USB) cable 292. In addition, the head unit 200 may perform near field communication (NFC). The head unit 200 may perform NFC with the mobile device 250 of the registered passenger through the pairing method or the like.

The head unit 200 may operate based on a voice recognition control. For this purpose, a voice recognition button 204 may be mounted to the steering wheel 202, and a microphone 206 may be mounted to an upper part of the driver seat. The voice recognition button 204, the microphone 206, the speaker 216, etc. may be used as auxiliary devices for voice recognition control of the head unit 200.

Referring to FIG. 2, the mobile device 250 may be connected to the head unit 200 so as to communicate with the head unit 200. The mobile device 250 may include a portable communication/computing device such as a smartphone or tablet, and may include an external storage device, for example, an external hard disk drive (HDD), an external solid state drive (SSD), and a USB memory. In addition, an Internet of Things (IoT) device and a streaming service provider may be connected as the mobile devices to the head unit 200. The head unit 200 may receive multimedia content from the mobile device 250, and may output the received multimedia content through the display 214 or the speaker 216 of the head unit 200.

There are various methods for controlling the mobile device 250 to transmit the multimedia content to the head unit 200 in a manner that the multimedia content can be reproduced in the head unit 100. For example, the mobile device 250 may transmit the multimedia content to the head unit using wired/wireless communication channels formed between the mobile device 250 and the head unit 200, and may reproduce the received multimedia content through the head unit 200.

In another method, under the condition that wired/wireless communication channels are formed between the mobile device 250 and the head unit 200, the mirroring image of the multimedia content reproduced by the mobile device 250 may be displayed on the display 214 of the head unit 200. For example, when the mobile device 250 supports "Car Mirroring" such as "Android Auto" of Google™' images of video content or navigation images implemented by the mobile device 250 may be mirrored on the display 214 of the head unit 200.

Figure 3:
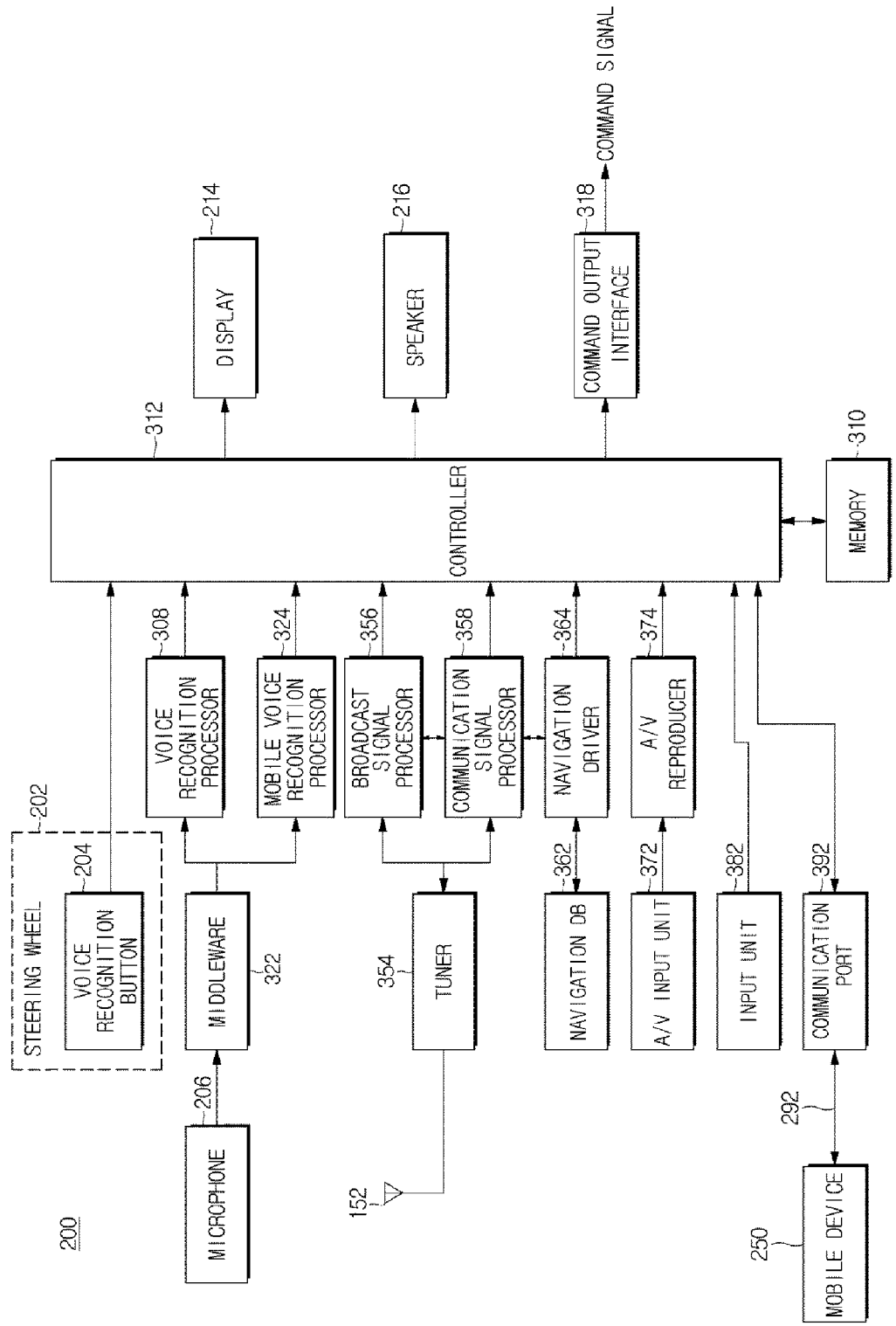
FIG. 3 is a block diagram illustrating a head unit of the vehicle according to embodiments of the present disclosure.

FIG. 3 is a block diagram illustrating the head unit of the vehicle according to embodiments of the present disclosure. As shown in FIG. 3, the head unit 200 of the vehicle 100 according to the embodiment may include the audio function, the video function, and the navigation function. Although the head unit 200 does not include all of the audio function, the video function, and the navigation function, the head unit 200 may be replaced with another head unit configured to support the car mirroring of the mobile device 250.

As can be seen from FIG. 3, the head unit 200 may be broadly classified into an element for the voice recognition function, an element for the general input function, an element for the broadcast/communication function, an element for the navigation function, an element for the audio/video function, and an element commonly used in the plurality of functions.

The constituent element for voice recognition may include a voice recognition button 204, a microphone 206, a middleware 322, a voice recognition processor 308, and a command output interface 318. Although a mobile voice recognition processor 324 mounted to the server located at a remote site is not used as the constituent element of the head unit 200, the mobile voice recognition processor 324 may be connected to the middleware 322 and the controller 312 of the head unit 200 through the external device (not shown) connected through wired/wireless communication, such that the mobile voice recognition processor 324 can communicate with the middleware 322 and the controller 312 of the head unit 200. The constituent element for the broadcast/communication function may include an antenna 152, a tuner 354, a broadcast signal processor 356, and a communication signal processor 358. The constituent element for the navigation function may include a navigation database (DB) 362 and a navigation driver 364. The constituent element for the audio/video function may include an audio/video (A/V) input unit 372 and an A/V reproducer 374. The constituent element for the general input function may include an input unit 372. The elements commonly used in the plurality of functions may include the memory 310, the controller 312, the display 214, and the speaker 216. The above-mentioned functional division is not limited to the above-mentioned description, and any one functional element may also be used for other functions.

The voice recognition button 204 may allow the vehicle driver or passenger to execute multiple functions of the head unit 200, for example, the audio function, the video function, the navigation function, the information communication function, etc. For this purpose, the voice recognition button may support Push-To-Talk (PTT) one-key manipulation. The voice recognition button 204 may be mounted to the steering wheel 202 which can be easily manipulated by the driver or passenger who rides in the vehicle. The steering wheel 202 may be used to change the traveling direction of the vehicle 100 by moving wheels of the vehicle 100 in a horizontal direction. The passenger (including the vehicle driver) who rides in the vehicle always grasps the steering wheel 202 during vehicle traveling. Thus, assuming that the voice recognition button 204 is mounted to the steering wheel 202, the passenger can easily manipulate the voice recognition button 204 during vehicle traveling. Although the voice recognition button 204 is exemplarily mounted to the steering wheel 202 for convenience of description, it should be noted that the voice recognition button 204 can also be mounted anywhere that the user (passenger) can easily manipulate the voice recognition button 204 during vehicle traveling.

During execution of the voice recognition control function, the microphone 206 may receive a voice signal from the driver or passenger, and may convert the received voice signal into electric signals. The microphone 206 may be a microphone installed for voice recognition control, or may share a hands-free microphone of the vehicle 100. In addition, the microphone 206 may be a microphone of the mobile terminal carried by the passenger. When using the microphone of the mobile terminal, the mobile terminal must be connected to the head unit 200 through near field communication such as Bluetooth.

The voice recognition processor 308 of the head unit 200 may receive the electric signal converted by the microphone 206 through the middleware 322, may perform voice recognition of the converted electric signal, and may extract text data indicating voice command information acting as the voice recognition result. The text data extracted by the voice recognition processor 308 may be transferred to the middleware 322, prior to transmission to the controller 312.

The middleware 322 serve as a relay, and may determine whether text data received from the voice recognition processor 308 of the head unit 200 is a reservation word for voice recognition control of the head unit 200 or a reservation word for voice recognition control of the mobile terminal 252. If text data is the reservation word for voice recognition control of the head unit 200, the middleware 322 may transmit the text data to the controller 312 of the head unit 200, and may implement voice recognition control of the head unit 200. In contrast, when the text data is not identical to the reservation word for voice recognition control of the head unit 200, the middleware 322 may transmit the text data to the mobile terminal 252, resulting in implementation of voice recognition control of the mobile terminal 252. That is, the middleware 322 may automatically determine whether the voice signal spoken by the passenger is the reservation word for voice recognition control of the head unit 200 or the reservation word for voice recognition control of the mobile terminal 252, and may relay the determined result. In this case, the passenger intervention for discriminating between the reservation word for voice recognition control of the head unit 200 and the reservation word for voice recognition control of the mobile terminal 252 is unnecessary.

The command output interface 318 may transmit a control command corresponding to voice command information extracted as the voice recognition result from the controller 312 to a control target device.

The antenna 152 may receive or transmit a radio frequency (RF) signal so as to receive a broadcast signal or as well as to transmit/receive a communication signal. The antenna 152 may be connected to the tuner 354 so as to communicate with the tuner 354. Therefore, the RF signal received from the antenna 152 may be transferred to the tuner 354. The antenna 152 may be comprised of a plurality of antennas configured to transceiver different types of broadcast/communication signals. In the embodiment, the antenna 152 may receive DMB broadcast signals, and may receive 3G/LTE telematics signals.

The tuner 354 may convert the radio frequency (RF) signal received from the antenna 152 into an intermediate frequency (IF) signal or the like. In addition, the tuner 354 may convert a data signal to be transmitted into a public signal capable of being propagated in the air, and may transmit the public signal to the air. That is, the tuner 354 may extract only the signal of a specific band, or may combine the data signal with a carrier signal. The tuner 354 may receive the broadcast signal, and may transmit and receive the communication signal. The broadcast signal may include a radio broadcast signal and a DMB broadcast signal. The communication signal may include a satellite communication signal related to a GPS system.

In addition, the communication signal may include a telematics communication signal. Information as to which signal will be received and processed by the tuner 354 may be determined by the control signal transferred from the controller 312 to the tuner 354. For example, assuming that the controller 312 generates a control signal needed to receive a radio broadcast signal of a specific channel and outputs the control signal to the tuner 354, the tuner 354 may receive the radio broadcast signal of the corresponding channel in response to the control signal received from the controller 312. If the controller 312 transmits a control signal for transmitting the telematics signal and transmission (Tx) data to the tuner 354, the tuner 354 may convert the Tx data into a signal format capable of being transmitted over the air in response to the control signal from the controller 312, and may transmit the converted signal over the air through the antenna 152. In addition, the tuner 354 may acquire information regarding a broadcast channel contained in the broadcast signal. The broadcast signal applied to the tuner 354 may include a title of a broadcast channel, a service ID (identification), and broadcast data. The tuner 354 may extract the title of the broadcast channel, the service ID, and broadcast data contained in the broadcast signal, and may transmit the extracted information to the broadcast signal processor 356 and the controller 312.

The broadcast signal processor 356 may classify the broadcast signal generated from the tuner 354 into a video broadcast signal and an audio broadcast signal, and may perform a series of signal processing. The series of signal processing achieved by the broadcast signal processor 356 may include analog-to-digital conversion (ADC), and digital-to-analog conversion (DAC), and may include converting video data into a signal format capable of driving the display 214.

The communication signal processor 358 may perform processing of the communication signal with the GPS satellite and may perform processing of the telematics communication signal. That is, the communication signal processor 358 may convert the received communication signal into a data format capable of being transferred to the controller 312. The communication signal processor 358 may receive data to be transmitted from the tuner 354 and the antenna 152, and may convert the received data into a communicable signal format.

The navigation DB 362 may include data for implementing navigation. The navigation DB 362 may be a memory card or a Digital Versatile Disc (DVD) format. In addition, navigation data received from the mobile terminal connected to the wired/wireless link (e.g., Android Auto™) may also be used as the navigation DB.

The navigation driver 364 may construct a navigation screen image on the display 214 using data received from the navigation DB 362. For this purpose, navigation setting information, such as a destination, a waypoint, and a route type established by the passenger, may be received from the controller 312. In addition, for navigation implementation, current position information of the vehicle 100 obtained through communication with the GPS satellite may be received from the controller 312.

The A/V input unit 372 may be an optical disc drive. In another example, the A/V input unit 372 may be a USB input/output (I/O) device or an auxiliary I/O terminal (referred to as AUX). Alternatively, the A/V input unit 372 may be a Bluetooth device for wireless connection to the mobile terminal. The mobile terminal connected to the A/V input unit 372 through Bluetooth may be a mobile phone or a portable digital sound source player.

The A/V reproducer 374 may output A/V data received through the input unit 372 to the speaker 216 or the display 214. For example, when the A/V input unit 372 is an optical disc drive, the optical disc drive may read A/V data written in the optical disc (e.g., CD, DVD, BD, etc.), and may retrieve the read A/V data. The A/V reproducer 374 may convert A/V data retrieved by the A/V input unit 372 into a signal capable of driving the speaker 216 or the display 214, and may transmit the converted signal to the speaker 216 or the display 214, such that A/V data can be reproduced. A/V data received from other media other than the optical disc may pass through the A/V reproducer 374, and may be converted into a signal capable of driving the speaker 216 or the display 214.

The input unit 382 may be at least one button mounted to the head unit 200, or a touchscreen implemented on the display 214. The passenger may select one of the multiple functions of the head unit 200 through manipulation of the input unit 382, and may perform various setting actions in a manner that a desired task can be performed from the selected function. The voice recognition button 204 of the steering wheel 202 may be contained in the at least one button constructing the input unit 382.

For example, the communication port 392 may include a USB port, a FireWire port, or the like. A communication cable is inserted into the communication port 392, and the head unit 200 can be connected to the mobile device 250 connected to the communication cable, such that the head unit 200 can communicate with the mobile device 250.

The controller 312 may perform necessary control in association with the overall operation of the head unit 200. For example, the initial entry screen image for performing the voice recognition function in response to manipulation of the voice recognition button 204 may be displayed on the display 214, or a voice message related to the voice recognition function may be output through the speaker 216. In addition, the controller 312 may receive voice command information from the voice recognition processor 308, and may generate a control command corresponding to the corresponding voice command information, such that control corresponding to the voice command information can be achieved. In addition, the controller 312 may process broadcast/communication signals. If A/V data generated after processing of the broadcast/communication signals must be output to the speaker 216 or the display 214, the corresponding A/V data is transferred to the speaker 216 or the display 214, such that necessary A/V data can be output. In addition, assuming that the passenger selects the navigation function, the controller 312 may control the navigation DB 362, the navigation driver 364, the display 214, and the speaker 216, resulting in implementation of navigation. The controller 312 may control A/V data received through the A/V input unit 372 to be reproduced by the A/V reproducer 374, and may transmit the reproduced A/V data to the speaker 216 or the display 214, such that necessary A/V data can be output. In addition, the controller 312 may convert a title of a broadcast channel extracted from the broadcast signal into text data, and may transmit the converted title to the voice recognition processor 308.

The memory 310 may store various applications needed to perform the voice recognition function, the broadcast/communication function, the navigation function, and the A/V function of the head unit 200, and may store screen display data needed to execute the applications, voice data, sound effect data, etc.

The display 214 may output video data needed when the multiple functions of the head unit 200 (for example, the voice recognition function of the head unit 200, the broadcast/communication function, the navigation function, the A/V function, etc.) are performed. For example, information screen images, messages, video data, etc. of the respective functions may be output through the display 214. In addition, the display 214 may display a user interface (UI) for allowing the passenger to manipulate the plurality of functions of the head unit 200. For example, the user interface (UI) needed for the user who desires to perform the navigation function, the broadcast (radio/DMB) function, the air-conditioning function, and the other audio function of the head unit 200 may be displayed on the display 214. However, in order for the vehicle driver to concentrate on the safe driving during traveling of the vehicle 100, display of video content through the display 214 may be limited.

The speaker 216 may output audio data needed when multiple functions of the head unit 200 (e.g., the voice recognition function, the broadcast/communication function, the navigation function, and the A/V function) are performed. For example, voice messages, the sound effect, and audio data of the respective functions may be output through the speaker 216.

Figure 4:
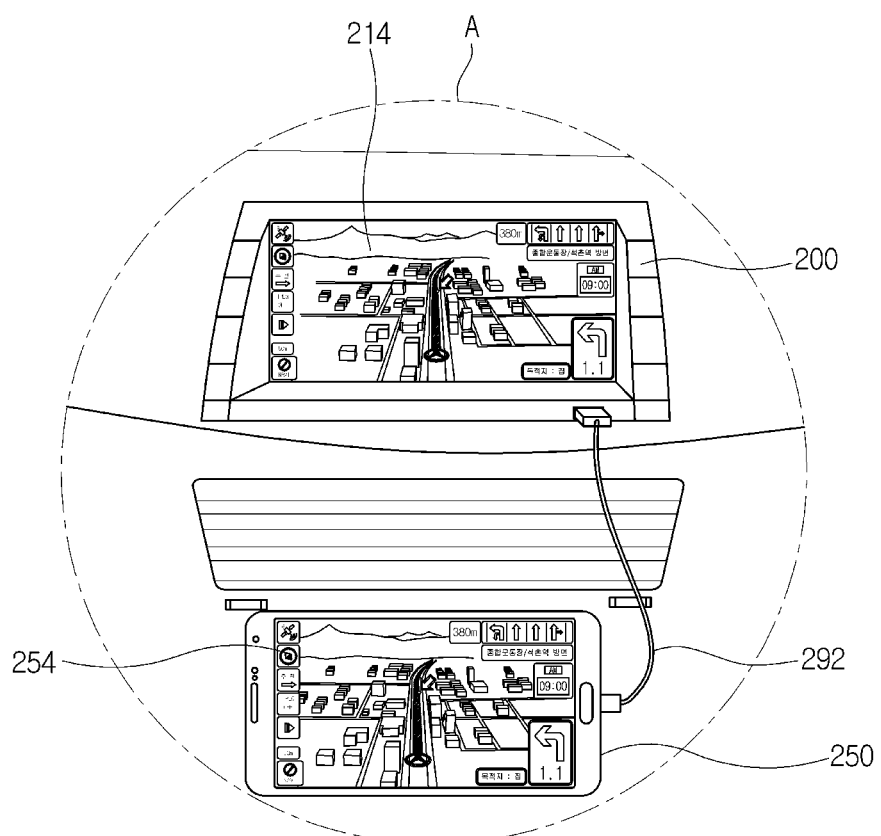
FIG. 4 is a conceptual diagram illustrating USB connection between a head unit and a mobile device according to embodiments of the present disclosure.

FIG. 4 is a conceptual diagram illustrating USB connection between a head unit and a mobile device according to embodiments of the present disclosure. As shown in FIG. 4, the head unit 200 of the vehicle 100 may be connected to the mobile device 250 of the user through the USB cable 292. Of course, the head unit 200 of the vehicle 100 may be wirelessly connected to the mobile device 250 of the user. If the head unit 200 of the vehicle 100 is connected to the mobile device 250 of the user by wire or wirelessly, the car mirroring function can be performed. The car mirroring function may control the head unit 200 of the vehicle 100 to interact with the mobile device 250 in a manner that content displayed on the display 254 of the mobile device 250 is also displayed on the display 214 of the head unit 200, such that not only reproduction of the multimedia content implemented in the mobile device 250, but also confirmation of the navigation, the voice call, and the message reception may also be displayed on the display 214 of the head unit 200. The above-mentioned car mirroring may utilize the large-sized display 214 of the head unit 200, instead of utilizing the small-sized display 254 of the mobile device 250. Since the voice recognition function supported only by the mobile device 250 can also be utilized in the head unit 200 of the vehicle 100, the car mirroring function is very useful. A representative example of the car mirroring function is "Android Auto" of Google. The above-mentioned car mirroring can be normally operated on the condition that the head unit 200 of the vehicle 100 is connected to the mobile device 250 of the user by wire or wirelessly.

Figure 5:
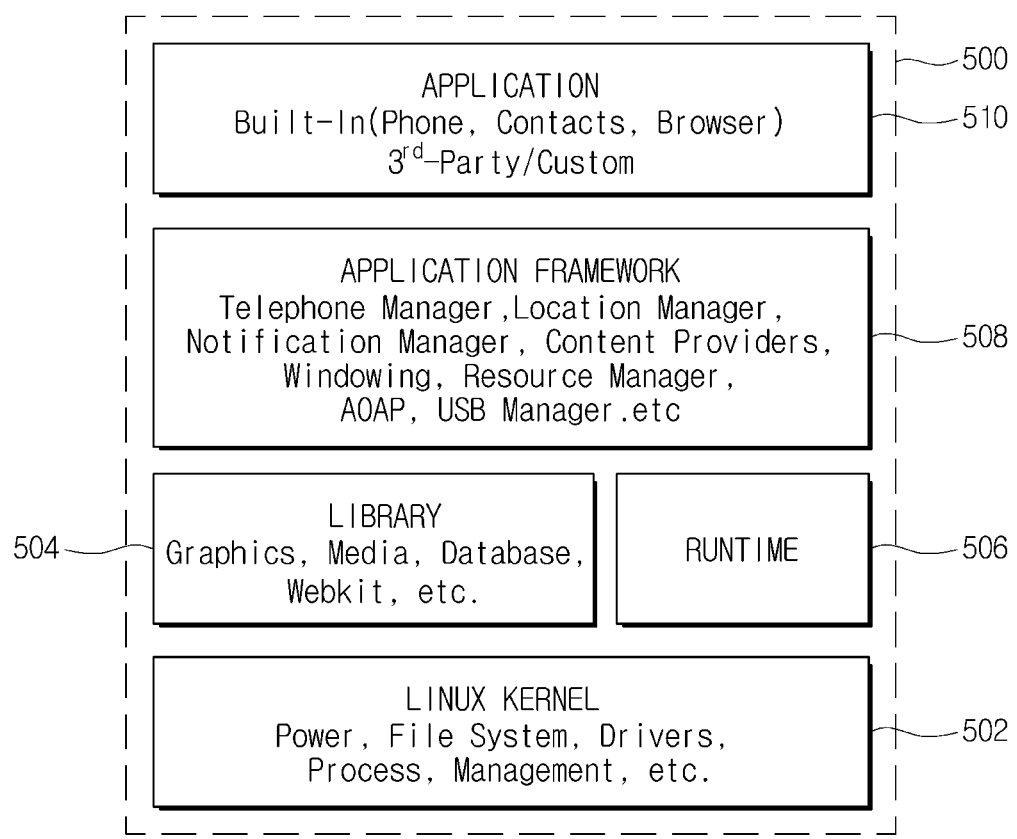
FIG. 5 is a conceptual diagram illustrating an Android platform mounted to the mobile device.

FIG. 5 is a conceptual diagram illustrating an Android platform mounted to the mobile device. As shown in FIG. 5, the Android operating system may be installed in the mobile device 250 (e.g., smartphone, tablet, laptop, etc.) based on Android. The Android platform 500 of FIG. 5 is mounted to the mobile device 250 such that the Android platform 500 may operate as the Android operating system. The Android platform 500 may be composed of a plurality of layers including a Linux kernel 502, a library 504, an application framework 508, and an application 510.

The Linux kernel 502 may be located at the lowest layer of the Android platform 500. The Linux kernel 502 may function as the operating system (OS) of the Android platform 500. That is, if the Android platform 500 is mounted to the mobile device 250, the Linux kernel 502 may operate at the OS of the mobile device 250. The Linux kernel 502 may perform various tasks of the mobile device 250, for example, power supply, power system management, multi-tasking support, memory management, process execution/management, etc. In addition, the Linux kernel 502 may provide various device drivers for network interfacing and hardware interfacing.

The device drivers provided from the Linux kernel 502 may include a display driver, a USB driver, a Bluetooth driver, a camera driver, a binder driver, a shared memory driver, an audio driver, a Wi-Fi driver, etc. The USB driver from among the above-mentioned drivers may support USB communication between the USB host and the USB accessory. In the USB accessory mode, under the condition that the mobile device 250 of the user is connected to the head unit 200 of the vehicle 200 through the USB cable 292, the head unit 200 may act as the USB host and the mobile device 250 may act as the USB accessory.

The library 504 of the Android platform 500 may be located at an upper layer of the Linux kernel 502. The library 504 of the Android platform 500 may include the standard Java library and the Android Library. The standard Java library may support general tasks, for example, character string processing, file processing, networking, etc. The Android library may be various Java libraries specialized for Android application development. The Android library may implement user interface (UI) creation, graphics processing, database (DB) access, etc.

The RunTime 506 of the Android platform 500 may be located at an upper layer of the Linux kernel 502, and the upper layer of the Linux kernel 502 may be located at the same level layer as the library 504. The RunTime 506 of the Android platform 500 may be a virtual machine for executing the Android application written in Java. The reason why a single application is easily driven simultaneously while maintaining compatibility in various environments including different types of chipsets and different hardware conditions is the presence of the RunTime 506. Java application may be compiled into byte code, and the byte code is distributed and installed. Whenever the Java application is executed, the byte code is converted into executable code in the RunTime acting as the virtual machine. Dalvik has been mainly used in the RunTime. In the version developed after Kit Kat from among Android versions, the Android RunTime (ART) is added to this version, and one of the Dalvik and the Android RunTime (ART) can be selected.

The application framework 508 in the Android platform 500 may be located at the upper layer of the library 502 and the RunTime 506. The above-mentioned library 504 may also be identified as the same layer as in the application framework 508. The application framework may be a group of classes configured to implement the application standard structure for the Android platform 500. The application framework 508 may provide the cooperation-type software environment to facilitate the development of software applications or solution.

The application framework 508 may include various managers. That is, the application framework 508 may include a telephone manager, a location manager, a notification manager, at least one content provider, a window manager (Windowing), a resource manager, an Android Open Accessory Protocol (AOAP), a USB manager, etc. in the application framework 508. The AOAP may perform data communication in byte units through USB communication in the Android environment. The USB manager may enumerate the list of USB accessories connected to the USB host, and may conduct device open requesting for communication as well as authority requesting.

The application 510 may be a group of the application software executed in the Android environment.

The application 510 may be classified into a basic application, a third party application, a custom application, etc. The application 510 may also be referred to as an "App." The basic application was installed as the factory default setting in the device (e.g., the mobile device 250) including the Android platform 500. For example, the telephone application, the address book application, the Web browser, etc. may be contained in the basic application 510. Third-Party Application may be the application provided from the external application provider. Most free/charged applications provided through Google Play™ of Google™ or App Store™ of Apple™ may correspond to third party applications. Android Auto™ may be one of third party applications for vehicles based on Google Play. Custom Application is an application specialized for a specific user. As an example of Custom Application, vehicle telematics application provided to customers who purchase a specific vehicle manufactured by a specific vehicle company may be used.

Figure 6:
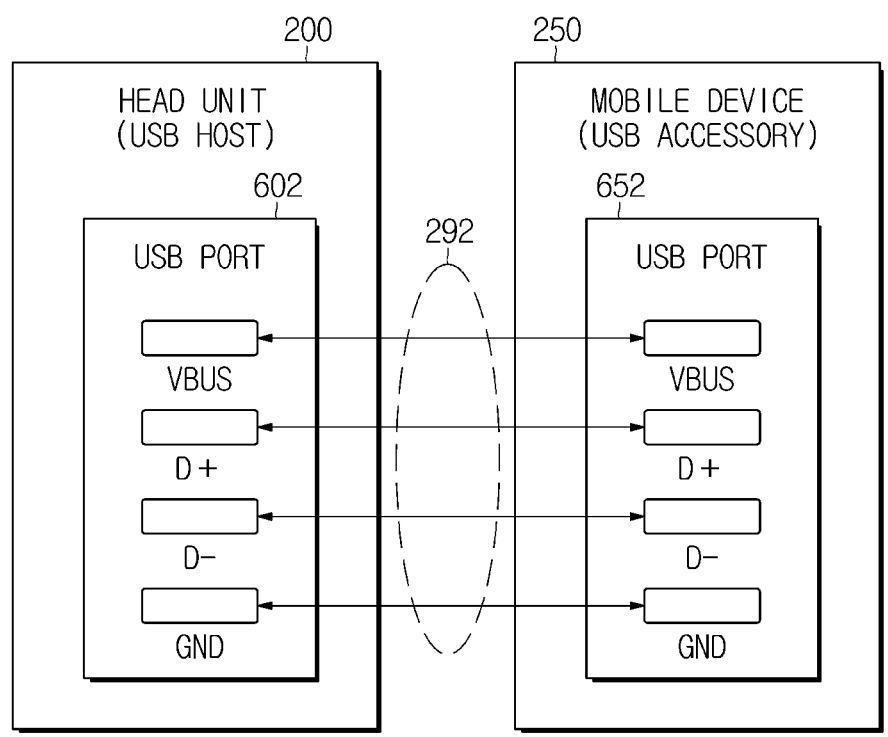
FIG. 6 is a view illustrating USB ports respectively connected to the head unit and the mobile device according to embodiments of the present disclosure.

FIG. 6 is a view illustrating USB ports respectively connected to the head unit and the mobile device according to embodiments of the present disclosure.

As shown in FIG. 6, the head unit 200 may include a USB port 602 for USB connection, and the mobile device 250 may include a USB port 652 for USB connection. The USB port 602 of the head unit 200 may include power-supply terminals and data transmission/reception (Tx/Rx) terminals. The power-supply terminals may include VBUS and GND terminals. The data Tx/Rx terminals may include D+ and D− terminals. The USB port 652 of the mobile device 250 may also include power-supply terminals and data Tx/Rx terminals in the same manner as in the USB port 602 of the head unit 200. The power-supply terminals may include VBUS and GND terminals. The data Tx/Rx terminals may include D+ and D− terminals.

If the head unit 200 is connected to the mobile device 250 through the USB cable 292, terminals (VBUS, D+, D−, GND) of the USB port 602 of the head unit 200 are electrically connected to terminals (VBUS, D+, D−, GND) of the USB port 652 of the mobile device 250, such that power supply and data transmission may be achieved between the head unit 200 and the mobile device 250.

In the USB accessory mode, the head unit 200 may operate as the USB host, and the Android-based mobile device 250 may operate as the USB device (USB accessory). In the USB accessory mode, power supply may be achieved in a direction from the head unit 200 acting as the USB host to the mobile device 250 acting as the USB accessory, whereas power supply is not achieved in the opposite direction (i.e., the direction from the mobile device 250 to the head unit 200). That is, during the USB accessory mode, power supply is not achieved in the direction from the mobile device 250 to the head unit 200.

Differently from the above example in which power supply is forcibly achieved in the direction from the head unit 200 to the mobile device 250, bi-directional data transmission may be achieved between the head unit 200 acting as the USB host and the mobile device 250 acting as the USB accessory. In other words, data transmission may be achieved in the direction from the head unit 200 to the mobile device 250. If necessary, data transmission may also be achieved in the opposite direction from the mobile device 250 to the head unit 200.

Figure 7:
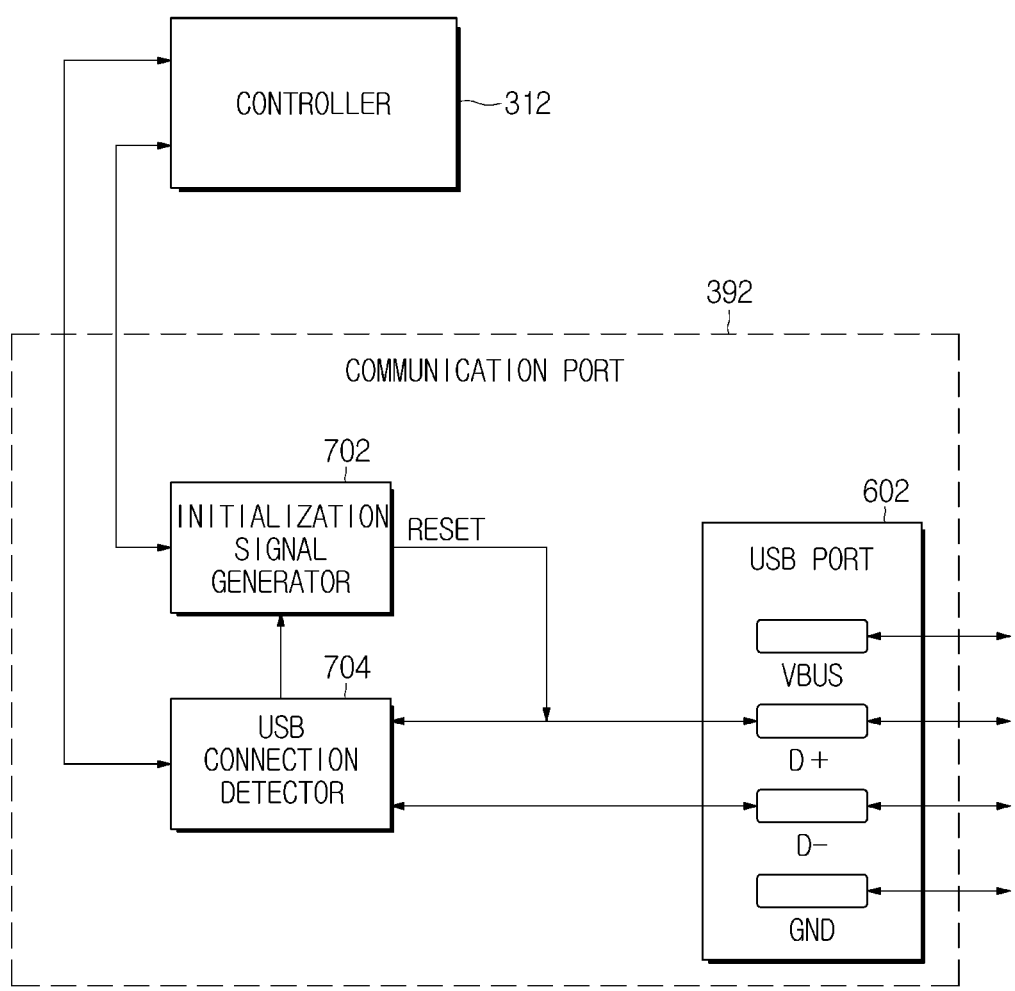
FIG. 7 is a block diagram illustrating a communication port of the head unit.

FIG. 7 is a block diagram illustrating a communication port of the head unit. As shown in FIG. 7, the communication port 392 may include a USB port 602, an initialization signal generator 702, and a USB connection detector 704. The initialization signal generator 702 and the USB connection detector 704 may be controlled by the controller 312, resulting in implementation of USB communication control. The USB port 602 of FIG. 7 may be identical to the USB port 602 of the head unit 200 illustrated in FIG. 6. The USB port 602 of the head unit 200 may be connected to the USB port 652 of the USB accessory (i.e., the mobile device 250) through the USB cable 292.

The initialization signal generator 702 may generate an initialization signal (RESET) for initializing data Tx/Rx terminals (D+, D−) of the USB port 602. Only when the USB port 602 is initialized while the initialization signal (RESET) remains at a high level as a default value, the initialization signal (RESET) may switch from a high level to a low level, such that the signal level of the data Tx/Rx terminal (D+) may remain at a low level for a predetermined time.

The USB connection detector 704 may detect a USB communication connection state between the head unit 200 acting as the USB host and the mobile device 250 acting as the USB accessory on the basis of reception of protocol response signals received through the data Tx/Rx terminals (D+, D−). Assuming that the USB connection detector 704 receives a wrong response signal from the mobile device 250 or receives a normal protocol response signal from the mobile device 250 within a predetermined time, or although the USB connection detector 704 receives the normal protocol response signal from the mobile device 250 and then receives the response signal after lapse of the predetermined time, the USB connection detector 704 may recognize interruption of USB communication between the head unit 200 and the mobile device 250. In contrast, assuming that the USB connection detector 704 receives the normal protocol response signal within the predetermined time, the USB connection detector 704 may determine that USB communication between the head unit 200 and the mobile device 250 is normally achieved.

Figure 8A:
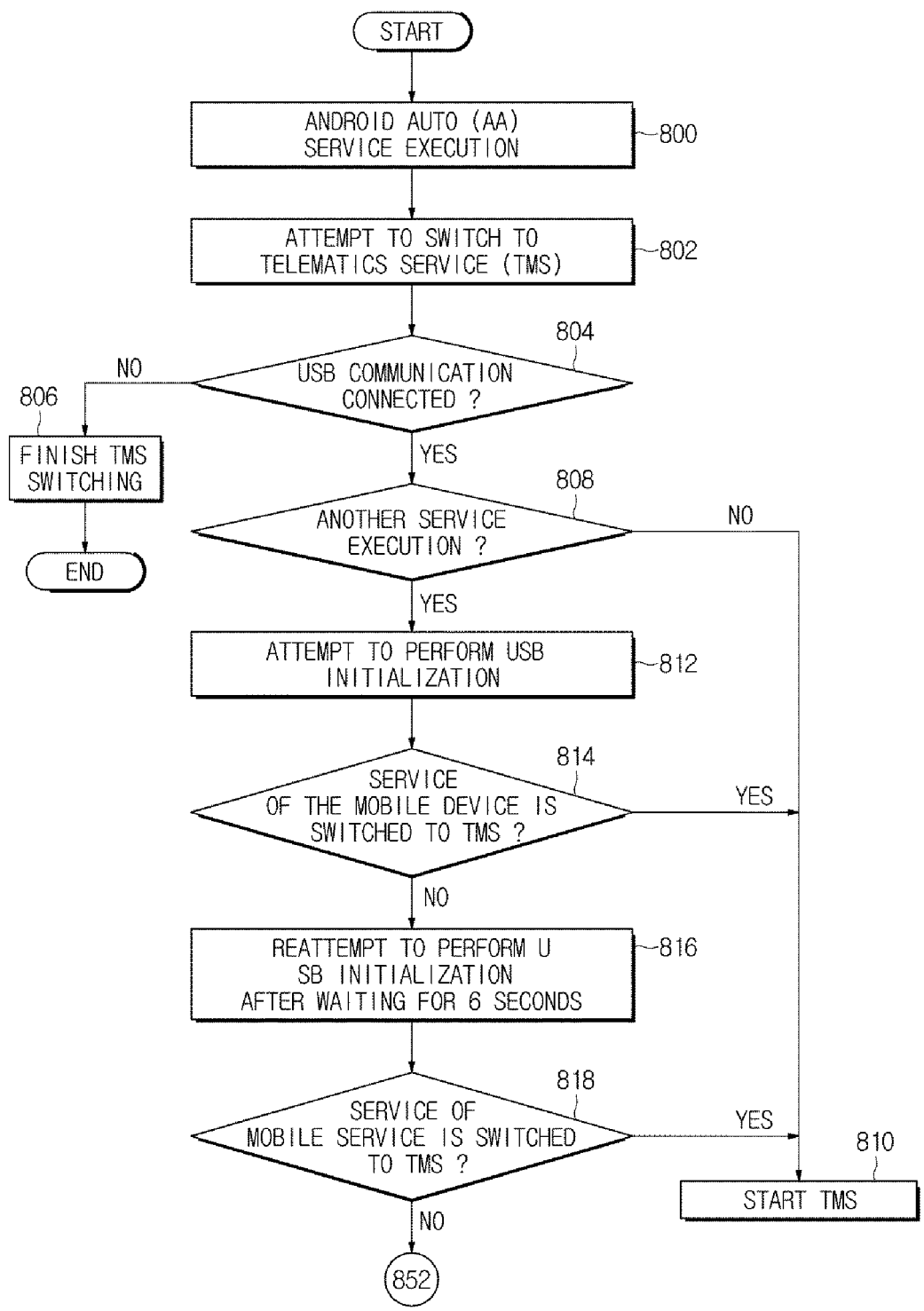
FIGS. 8A and 8B are flowcharts illustrating a USB communication control method according to embodiments of the present disclosure.
Figure 8B:
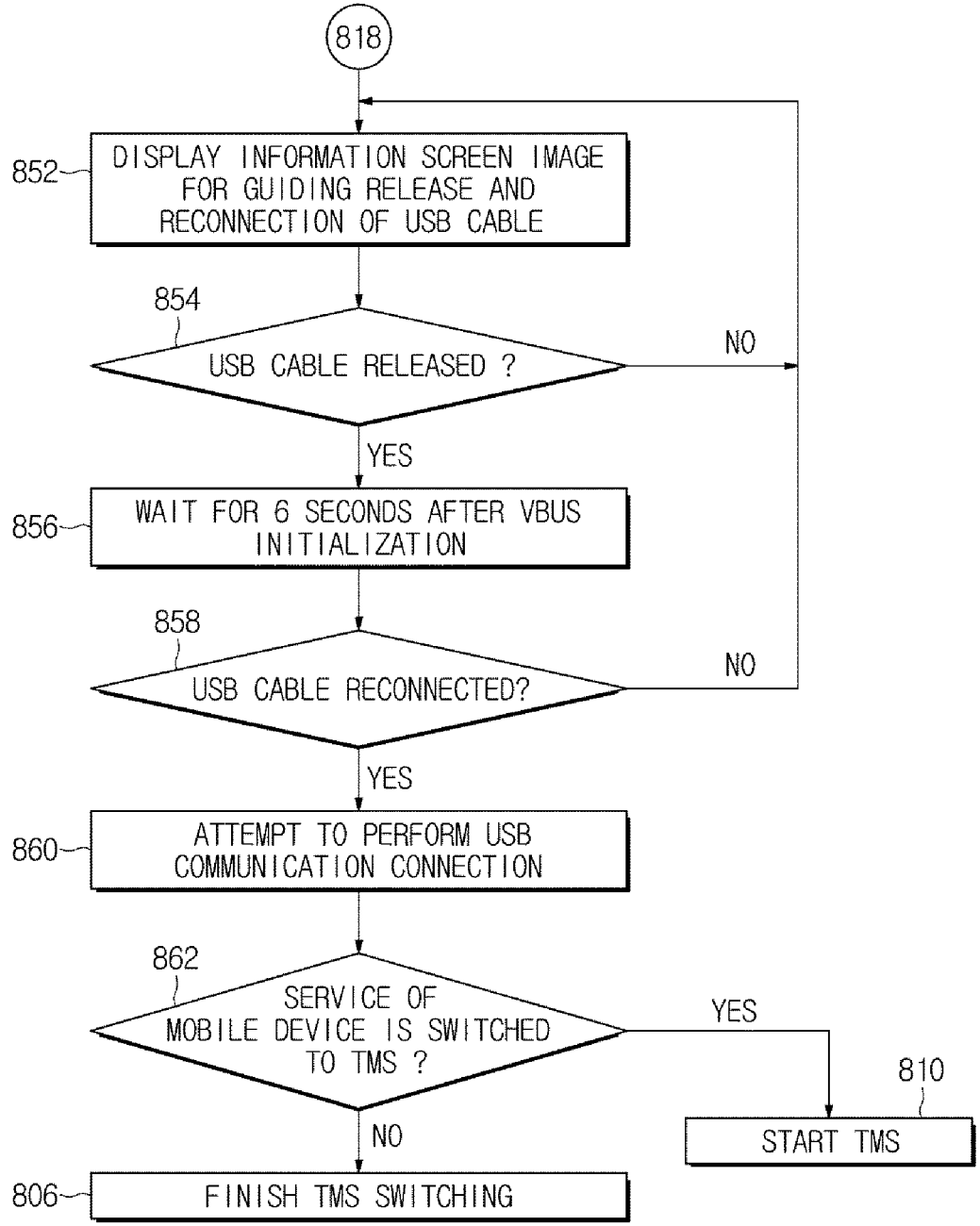

FIGS. 8A and 8B are flowcharts illustrating a USB communication control method according to embodiments of the present disclosure. As shown in FIGS. 8A and 8B, when a user desires to switch a current service to the other service while an Android-based USB host is connected to an Android-based USB accessory through a USB cable, the USB cable need not be physically disconnected from the USB host and the USB accessory, and the service is switched to the other service without re-connection of the USB cable, the USB accessory, and the USB host.

In the following description, "Android Auto" is an example of a first service, and may be denoted by "AA" as shown in FIGS. 8A and 8B. In the following description, "Telematics" is an example of a second service, and may be denoted by "TMS" as shown in FIGS. 8A and 8B.

In FIG. 8A, the Android Auto service is being executed in the head unit 200 of the vehicle 100 in operation 800. In this case, the Android Auto service may occupy the USB port 502 in the USB driver of the Linux kernel 502 of the Android platform 500.

If the user selects the telematics service, the head unit 200 may attempt to switch to the telematics service so as to use the telematics service in response to user selection in operation 802.

The head unit 200 may confirm whether USB communication is currently being achieved on the condition that the head unit 200 is physically connected to the mobile device 250 through the USB cable 292 in operation 804. This confirmation process may be achieved by the USB driver of the Linux™ kernel 502.

Assuming that the head unit 200 is not connected to the mobile device 250 through the USB cable 292 in operation 804, the head unit 200 does not attempt to perform telematics service switching any longer, and then stops operation in operation 806. Assuming that the head unit 200 is not connected to the mobile device 250 through the USB cable 292, it is impossible to implement USB communication between the head unit 200 and the mobile device 250, such that it may also be possible to perform switching to the telematics service interacting with the mobile device 250.

Assuming that the head unit 200 is connected to the mobile device 250 through the USB cable 292 in operation 804, the head unit 200 may request current state information from each service and determine whether another service is currently being executed in operation 808. Assuming that the head unit 200 is connected to the mobile device 250 through the USB cable 292, it is possible to perform USB communication between the head unit 200 and the mobile device 250, such that switching to the telematics service interworking with the mobile device 250 may also be carried out. However, it is determined whether another service is currently being executed before switching to the telematics service, such that it is desirable that the procedure for receiving USB port authority occupied by the current execution service is performed prior to switching to the telematics service.

Assuming that another service is currently being executed in operation 808, the telematics service may start in response to a service switching request in operation 810. Assuming that non-execution of the other service is decided, no more measures are required prior to switching to the telematics service, such that the telematics service may immediately start.

If the other service is currently being executed in operation 808 (for example, if the USB port is occupied because the current Android Auto service is currently being executed), the USB driver of the Linux kernel 502 may transmit a request for temporary interruption of USB communication connection to the Android Auto service, and may attempt to perform USB initialization to perform the telematics service in operation 812. Targets to be initialized may be data terminals (D+, D−) of the USB port 602.

The head unit 200 may confirm whether switching to the telematics service was carried out in the mobile device 250 in operation 814. That is, the mobile device 250 may confirm whether switching to the telematics service was successful or failed, and may confirm whether the USB accessory was connected between the head unit 200 and the mobile device 250. This confirmation process may be achieved by the USB driver of the Linux kernel 502. Assuming that switching to the telematics service was successfully performed in the mobile device 250 in operation 814, the telematics service may start in operation 810.

Assuming that telematics service switching fails in the mobile device 250 and USB communication connection of the current execution Android Auto service is continuously maintained in operation 814, the mobile device 250 enters the standby mode for about 6 seconds and then resumes USB initialization in operation 816. Targets to be initialized may be data terminals (D+, D−) of the USB port 602. The mobile device 250 requires a predetermined delay time during service switching in the USB accessory mode. If a sufficient delay time is not given, service switching failure of the USB accessory mode may occur. Since the delay time needed to switch the USB accessory mode of the mobile device 250 is changed according to the types (models) of the mobile device 250, the delay times requested according to the types (models) of the mobile device 250 are sufficiently considered, such that a USB initialization reattempt time is determined. The standby time of about 6 seconds generated before the above-mentioned USB initialization reattempt is an example of the delay time, and different standby times may be established in consideration of the types (models) of the mobile device 250.

The head unit 200 may confirm whether telematics service switching was achieved in the mobile device 250 in operation 818. That is, the head unit 200 may confirm whether telematics service switching was successfully performed in the mobile device 250, and may confirm whether USB accessory connection between the head unit 200 and the mobile device 250 was achieved. This confirmation process may be carried out by the USB driver of the Linux kernel 502.

If telematics service switching was successfully performed in the mobile device 250 in operation 818, the telematics service may start in operation 810.

Subsequent operations will hereinafter be described with reference to FIG. 8B.

If telematics service switching fails in the mobile device 250 in operation 818, this means that service switching through initialization of the data terminals (D+, D−) failed, such that the USB cable should be disconnected and should then be reconnected to the USB host and the USB accessory so as to perform USB initialization. For this purpose, an information screen image for providing the user with necessary information is displayed in operation 852, such that the user who views the information screen image can physically disconnect the USB cable 292 from the head unit 200 and the mobile device 250 and can then reconnect the USB cable 292 to the head unit 200 and the mobile device 250. Display of the screen image may be achieved through the head unit 200, or may be achieved through the mobile device 250.

The head unit 200 may confirm whether the USB cable 292 was physically disconnected from the head unit 200 and the mobile device 250 in operation 854. This confirmation process may be achieved by the USB driver of the Linux kernel 520.

If disconnection of the USB cable 292 disposed between the head unit 200 and the mobile device 250 is confirmed in operation 854, the head unit 200 may perform USB initialization through the USB driver of the Linux kernel 502, and may then enter the standby mode for about 6 seconds in operation 856. In this case, the target to be initialized may be the VBUS terminal used in power supply of the USB port 602. The mobile device 250 may require a predetermined delay time during service switching in the USB accessory mode. If a sufficient delay time is not given, service switching failure of the USB accessory mode may occur. Since the delay time needed to switch the USB accessory mode of the mobile device 250 is changed according to the types (models) of the mobile device 250, the delay times requested according to the types (models) of the mobile device 250 are sufficiently considered, such that a USB initialization reattempt time is determined. The standby time of about 6 seconds generated before the above-mentioned USB initialization reattempt is an example of the delay time, and different standby times may be established in consideration of the types (models) of the mobile device 250. If the USB cable 292 disposed between the head unit 200 and the mobile device 250 is not disconnected in operation 854, the head unit 200 may enter the standby mode for a predetermined time until the USB cable 292 is disconnected.

After the disconnection or separation of the USB cable 292 disposed between the head unit 200 and the mobile device 250 is confirmed, the head unit 200 may confirm whether the USB cable 292 disposed between the head unit 200 and the mobile device 250 was reconnected in operation 858. This confirmation process may be achieved by the USB driver of the Linux kernel 520.

If reconnection of the USB cable 292 disposed between the head unit 200 and the mobile device 250 is confirmed in operation 858, this means that USB communication can be carried out, such that USB communication connection to the telematics service is attempted in operation 860.

The head unit 200 may confirm whether telematics service switching was normally achieved in the mobile device 250 in operation 862. That is, the mobile device 250 may confirm whether telematics service switching was successfully performed, and may also confirm whether USB accessory connection between the head unit 200 and the mobile device 250 was achieved. This confirmation process may be achieved by the USB driver of the Linux kernel 502.

If telematics service switching is achieved in the mobile device 250 in operation 862, the telematics service may start in operation 810.

If telematics service switching is not achieved in the mobile device 250 in operation 818, the head unit 200 may not attempt to perform telematics service switching any longer, and then stops operation in operation 806.

As is apparent from the USB communication control method described herein, when the user desires to switch a service being provided through an USB accessory to the other service while an USB host is connected to the USB accessory through a USB cable, the USB cable need not be physically disconnected from the USB host and the USB accessory, and the service is switched to the other service without re-connection of the USB cable, the USB accessory, and the USB host.

Although select embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A universal serial bus (USB) communication control method for a USB host connected to a USB accessory through a USB cable, the method comprising:
   receiving a request signal for switching from a first service to a second service in the USB accessory when the first service is being executed in the USB accessory;
   initializing a USB port of the USB host so as to perform switching to the second service in the USB accessory while the USB host is connected to the USB accessory through the USB cable;
   when the initialization of the USB port of the USB host fails, waiting for a standby time needed for service switching in the USB accessory, and then reattempting to initialize the USB port of the USB host so as to perform the switching to the second service in the USB accessory; and
   when the switching to the second service through initialization or re-initialization of the USB port is successfully performed, executing the second service in the USB accessory.

2. The USB communication control method according to claim 1, wherein the initializing of the USB port comprises:
   initializing a data terminal of the USB port.

3. The USB communication control method according to claim 1, wherein the first service and the second service are provided by execution of an application based on an Android operating system being executed in the USB accessory.

4. The USB communication control method according to claim 1, further comprising:
   when the switching to the second service through re-initialization of the USB port fails, disconnecting the USB cable from the USB port or the USB accessory, and then reconnecting the USB cable to the USB port or the USB accessory, thereby attempting to switch to the second service in the USB accessory.

5. The USB communication control method according to claim 4, further comprising:
   waiting for a predetermined time after disconnection of the USB cable, and then detecting reconnection of the USB cable.

6. The USB communication control method according to claim 4, further comprising:
   waiting for a predetermined time after reconnection of the USB cable, and then attempting to switch to the second service in the USB accessory.

7. The USB communication control method according to claim 4, further comprising:
   initializing a power-supply terminal of the USB port after disconnect of the USB cable.

8. A universal serial bus (USB) communication control method for a USB host connected to a USB accessory through a USB cable, the method comprising:
   receiving a request signal for switching from a first service to a second service in the USB accessory when the first service is being executed in the USB accessory;

initializing a USB port of the USB host so as to perform switching to the second service in the USB accessory while the USB host is connected to the USB accessory through the USB cable;

when the switching to the second service through initialization of the USB port fails, waiting for a standby time needed for service switching in the USB accessory, disconnecting the USB cable from the USB port or the USB accessory, and then reconnecting the USB cable to the USB port or the USB accessory, thereby attempting to switch to the second service in the USB accessory; and when the switching to the second service through initialization of the USB port or through disconnection and reconnection of the USB cable is successfully performed, executing the second service in the USB accessory.

9. The USB communication control method according to claim 8, further comprising:

waiting for a predetermined time after disconnection of the USB cable, and then detecting reconnection of the USB cable.

10. The USB communication control method according to claim 8, further comprising:

initializing a power-supply terminal of the USB port after disconnection of the USB cable.

* * * * *